(12) United States Patent
Park et al.

(10) Patent No.: US 9,647,862 B2
(45) Date of Patent: May 9, 2017

(54) APPARATUS AND METHOD FOR SUPPORTING DEVICE TO DEVICE COMMUNICATION

(71) Applicants: Samsung Electronics Co., Ltd., Gyeonggi-do (KR); Research & Business Foundation Sungkyunkwan University, Gyeonggi-do (KR)

(72) Inventors: Seung-Hoon Park, Seoul (KR); Hyung-Jin Choi, Seoul (KR); Kyung-Hun Won, Gyeonggi-do (KR); Won-Jun Hwang, Gyeonggi-do (KR); Kyung-Kyu Kim, Gyeonggi-do (KR); Dae-Gyun Kim, Gyeonggi-do (KR); Hyun-Seok Ryu, Gyeonggi-do (KR); Dong-Jun Lee, Gyeonggi-do (KR); Chi-Woo Lim, Gyeonggi-do (KR)

(73) Assignees: Samsung Electronics Co., Ltd., Gyeonggi-do (KR); Research & Business Foundation Sungkyunkwan University, Gyeonggi-do (KR)

( * ) Notice: Subject to any disclaimer, the term of this patent is extended or adjusted under 35 U.S.C. 154(b) by 0 days.

(21) Appl. No.: 14/213,948

(22) Filed: Mar. 14, 2014

(65) Prior Publication Data
US 2014/0270029 A1 Sep. 18, 2014

(30) Foreign Application Priority Data
Mar. 14, 2013 (KR) .................. 10-2013-0027578

(51) Int. Cl.
*H04L 27/06* (2006.01)
*H04L 27/26* (2006.01)

(52) U.S. Cl.
CPC ...... *H04L 27/2601* (2013.01); *H04L 27/2657* (2013.01); *H04L 27/2671* (2013.01); *H04L 27/2675* (2013.01)

(58) Field of Classification Search
CPC ......... H04L 1/0002; H04L 1/20; H04L 7/042; H04L 25/03006; H04W 84/12
(Continued)

(56) References Cited

U.S. PATENT DOCUMENTS 6,370,188 B1   4/2002   Wu et al.
8,611,470 B2 *   12/2013   Gupta ................. H04L 27/2647
        370/337

(Continued)

FOREIGN PATENT DOCUMENTS

| EP | 1049301 B1 | 6/2007 |
|---|---|---|
| KR | 10-2011-0112052 | 10/2011 |
| KR | 10-2012-0036018 | 4/2012 |

OTHER PUBLICATIONS

International Search Report dated Jun. 26, 2014 in connection with International Application No. PCT/KR2014/002185, 3 pages.
(Continued)

*Primary Examiner* — Daniel Washburn
*Assistant Examiner* — Fitwi Hailegiorgis

(57) ABSTRACT

A method for operating a device in a wireless communication system supporting Device to Device (D2D) communication system includes receiving a reference signal from each of at least one transmitting device, estimating a frequency offset between the reference signals and a comparison reference signal corresponding to the reference signals, and adjusting a transmit frequency of a voltage controlled oscillator of the device using the estimated frequency offset estimation. An apparatus for compensating for a frequency offset of a device in a wireless communication system supporting Device to Device (D2D) communication system
(Continued)

includes a frequency offset estimator configured to receive reference signals from each of at least one transmitting device, and estimating a frequency offset between the reference signals and a comparison reference signal corresponding to the reference signals, and a voltage controlled oscillator configured to adjust a transmit frequency using the estimated frequency offset.

19 Claims, 13 Drawing Sheets

(58) Field of Classification Search
 USPC ......... 375/343, 295, 323; 370/350, 337, 478
 See application file for complete search history.

(56) References Cited

U.S. PATENT DOCUMENTS

| | | | |
|---|---|---|---|
| 2006/0083329 A1* | 4/2006 | Sorrells et al. | ............... 375/295 |
| 2007/0202903 A1 | 8/2007 | Ge et al. | |
| 2009/0197535 A1 | 8/2009 | Roh et al. | |
| 2011/0007644 A1 | 1/2011 | Walker | |
| 2011/0228837 A1* | 9/2011 | Nentwig | ....................... 375/232 |
| 2011/0244807 A1 | 10/2011 | Yoon et al. | |
| 2011/0292927 A1 | 12/2011 | Lee et al. | |
| 2012/0087447 A1 | 4/2012 | Yoon et al. | |
| 2012/0195328 A1* | 8/2012 | Otsuka | .................... H04L 7/041 370/478 |
| 2013/0070751 A1* | 3/2013 | Atwal | ................. H04W 56/001 370/350 |

OTHER PUBLICATIONS

Written Opinion of the International Searching Authority dated Jun. 26, 2014 in connection with International Application No. PCT/KR2014/002185, 6 pages.

Zhang et al., "Performance Investigation of Distributed STBC-OFDM System With Multiple Carrier Frequency Offsets", The 17th Annual IEEE International Symposium on Personal, Indoor and Mobile Radio Communications (PIMRC '06), 1-4244-0330-8/06, 2006 IEEE, 5 pgs.

Jan-Jaap van de Beek et al., "On Synchronization in OFDM Systems Using the Cyclic Prefix", Div. of Signal Processing, Lulea University of Technology, S971 87 Lulea, Sweden, Jun. 1998, 5 pgs.

Tsai et al., "Cell Search in 3GPP Long Term Evolution Systems", IEEE Vehicular Technology Magazine, Jun. 2007, 7 pgs.

Kim et al., "An Iterative Decoding Technique for Cooperative STBC-OFDM Systems With Mulitple Carrier Frequency Offsets", The 18th Annual IEEE International Symposium on Personal, Indoor and Mobile Radio Communications (PIMRC '07), 1-4244-1144-0/07, 2007 IEEE, 4 pgs.

Moose, "A Technique for Orthogonal Frequency Division Multiplexing Frequency Offset Correction", IEEE Transactions on Communications, vol. 42, No. 10, Oct. 1994, 7 pgs.

\* cited by examiner

APPARATUS AND METHOD FOR SUPPORTING DEVICE TO DEVICE COMMUNICATION

CROSS-REFERENCE TO RELATED APPLICATIONS AND CLAIM OF PRIORITY

The present application is related to and claims the benefit under 35 U.S.C. §119(a) to a Korean patent application No. 10-2013-0027578 filed in the Korean Intellectual Property Office on Mar. 14, 2013, the entire disclosure of which is hereby incorporated by reference.

TECHNICAL FIELD

The present disclosure relates generally to a method and an apparatus for frequency synchronization including frequency offset estimation and frequency offset compensation in a Device to Device (D2D) communication system.

BACKGROUND

In a Device to Device (D2D) communication system, a node such as device discovers other neighboring node by itself, establishes a communication session with the other node, and then transmits traffic directly to the other node.

Hence, the traffic centralized to a base station is distributed to thus address traffic overload. The D2D communication system is drawing attention as an elemental technology of an advanced mobile communication technology, and a standard group such as $3^{rd}$ Generation Partnership Project (3GPP) or Institute of Electrical and Electronic Engineers (IEEE) is working on D2D communication standardization based on Long Term Evolution-Advanced (LTE-A) and Wireless Fidelity (WiFi).

A known technology for the D2D communication is FlashLinQ of Qualcomm. The FlashLinQ system defines a physical layer channel structure and a scheduling procedure for the D2D communication, measures a channel quality between the D2D devices for the scheduling, and defines a criterion for the communication based on the channel quality.

In the FlashLinQ system, the device discovers the neighboring device using single-tone signaling. Each device discovers the nearby device within a communication range and transmits a Peer Discovery Resource ID (PDRID) using an Orthogonal Frequency Division Multiplexing (OFDM) symbol in an arbitrary mini-slot in a device discovery interval. The device can discover and identify the neighboring device by demodulating a PDRID of other devices in the mini-slots excluding the above-mentioned mini-slot. However, the device cannot receive the PDRID of the other device in its transmit mini-slot.

For the D2D communication, it is necessary to specify a frame structure, the signaling, and the scheduling for the D2D communication. In the process of the discovery and the scheduling of the D2D communication system, the device receives a plurality of signals overlapping in a time domain from a plurality of devices. When the received signals include a frequency offset, the demodulation performance of the receive signal can deteriorate quite seriously due to a receive Signal to Noise Ratio (SNR) difference between the links between the receiving device and the distributed transmitting devices. To overcome the deterioration, frequency synchronization is required.

Thus, a method and an apparatus for the frequency synchronization in the D2D communication system are demanded.

SUMMARY

To address the above-discussed deficiencies it is a primary aspect of the present disclosure to provide a method and an apparatus for frequency synchronization in a wireless communication system supporting D2D communication.

Another aspect of the present disclosure is to provide a method and an apparatus for providing frequency synchronization using an independent operation of each device without the aid of a base station or an existing infrastructure in a wireless communication system including a wireless communication device and supporting D2D communication.

Yet another aspect of the present disclosure is to provide a method and an apparatus for independently estimating a frequency offset between a plurality of overlapping receive signals and a transmit link by estimating the frequency offset using a phase rotation difference between correlations of the receive signal and a reference signal of the transmit link without limiting a frequency offset estimation range in a wireless communication system supporting D2D communication.

Still another aspect of the present disclosure is to provide a method and an apparatus for rapid and precise frequency synchronization by correcting an oscillator transmit frequency using a mean of estimation values reflecting a power weight of a frequency offset received from a plurality of links for frequency offset compensation in a wireless communication system supporting D2D communication.

According to one aspect of the present disclosure, a method for operating a device in a wireless communication system supporting Device to Device (D2D) communication system includes receiving a reference signal from each of at least one transmitting device, estimating a frequency offset between the reference signals and a comparison reference signal corresponding to the reference signals, and adjusting a transmit frequency of a voltage controlled oscillator of the device, using the frequency offset estimation result.

According to another aspect of the present disclosure, an apparatus for compensating for a frequency offset of a device in a wireless communication system supporting D2D communication system includes a frequency offset estimator for receiving a reference signal from each of at least one transmitting device, and estimating a frequency offset between the reference signals and a comparison reference signal corresponding to the reference signals; and a voltage controlled oscillator for correcting a transmit frequency using the estimated frequency offset.

According to yet another aspect of the present disclosure, an apparatus of a device in a wireless communication system supporting D2D communication system includes a Radio Frequency (RF) processor for receiving a reference signal from each of at least one transmitting device; and a controller for estimating a frequency offset between the reference signals and a comparison reference signal corresponding to the reference signals. The RF processor includes a voltage controlled oscillator for adjusting a transmit frequency using the frequency offset estimation result.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication technologies. The following description with reference to the accompanying drawings is provided to assist in a comprehensive understanding of exemplary embodiments of the disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of exemplary embodiments of the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 1:
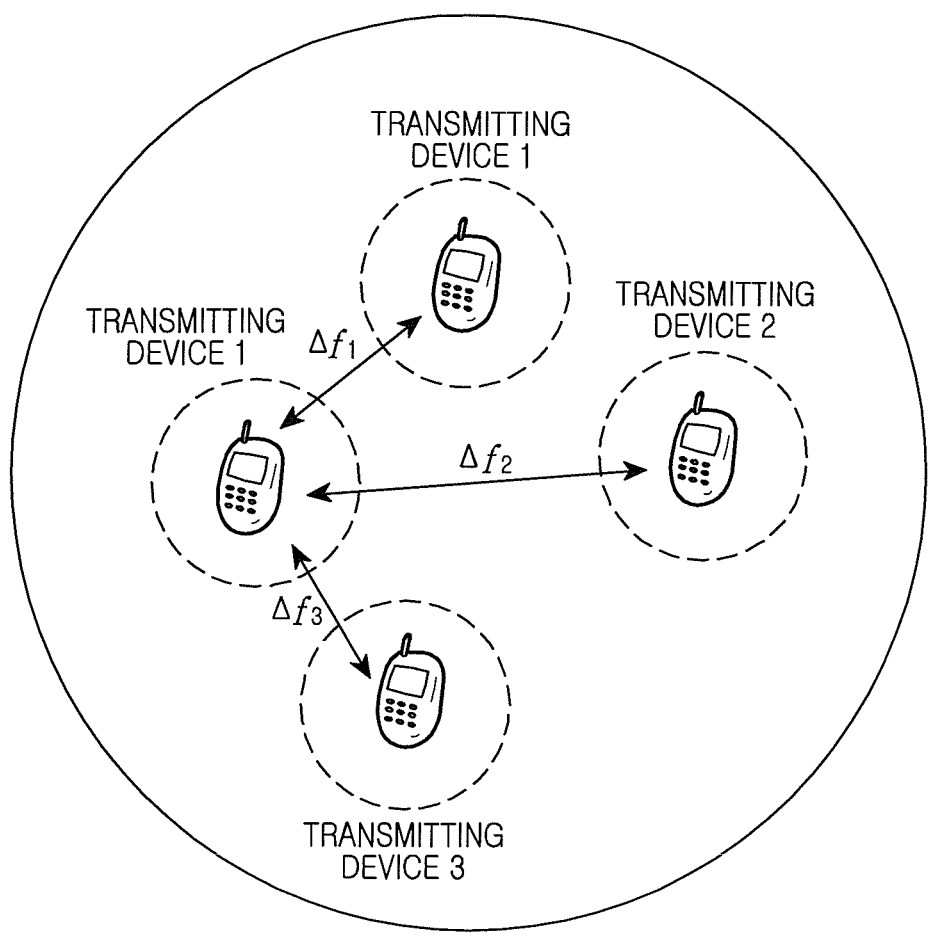
FIG. 1 illustrates multiple offsets between links in a D2D communication system.

FIG. 1 depicts multiple offsets between the links in a general D2D communication system.

Referring to FIG. 1, when links between a plurality of transmitting devices and a single receiving device include a plurality of frequency offsets and a reference signal of a communicating system for the synchronization is absent or unavailable to the device, it is necessary to synchronize the frequency between the devices or to compensate for distortion of the receive signal owing to the frequency offset without the synchronization in order to minimize the performance degradation of the receive signal caused by the frequency offset.

However, when the receive signal distortion is compensated without the frequency synchronization, frequency offset estimation needs to precede the receive signal distortion compensation. Even when the compensation is feasible, the performance is degraded by Inter-Carrier Interference (ICI) or complexity of the receiving stage for the ICI compensation of the device gets too high. As a result, it is practically hard to apply such a method.

Exemplary embodiments of the present disclosure provide a method and an apparatus for confirming message transmission in a Device to Device (D2D) communication system.

To achieve frequency synchronization between devices in the D2D communication system, accurate estimation and compensation of a frequency offset is required. For doing so, the present disclosure provides a method for estimating and compensating for the frequency offset.

The frequency offset estimation method of the present disclosure independently estimates the frequency offset between a plurality of signals received at a particular device from a plurality of devices, orthogonal in a frequency domain, and overlapping in a time domain.

Herein, the independent estimation of the frequency offset between the particular device and the multiple devices is based on correlation between the time-domain receive signal including a pilot signal in the corresponding link and a retained time-domain reference signal (including the pilot signal) of the multiple devices, and estimates the frequency offset of the corresponding link using a phase rotation difference between two correlations including a guard interval of an Orthogonal Frequency Division Multiplexing (OFDM) symbol and a first half interval of an effective interval.

According to the present frequency offset compensation method, the particular device accumulates a plurality of frequency offsets estimated based on the reference signal received from the other devices, compensates for the frequency offset corresponding to a mean of the accumulated frequency offset with its oscillator, and applies the compensated frequency offset to next transmission.

As such, the present disclosure can achieve the accurate frequency offset estimation per link and the fast and accurate frequency synchronization between the devices of a certain range by compensating for the frequency offset irrelevant to the receive signal power.

Now, the present frequency offset estimation method based on the time-domain correlation is elucidated.

The present frequency offset estimation method estimates the frequency offset by calculating the phase rotation between complex correlation results of a second half interval of the reference signal (including the pilot signal and acquired in advance) and the received reference signal of the device for the frequency offset estimation.

The receive signal is subject to the phase rotation due to the frequency offset as a symbol index increases in the time domain, and measures a phase change by performing the differential operation on the correlation result of the first half interval and the second half interval. The frequency offset can be estimated using the phase change.

A length between the first half interval and the second half interval of the signal for the complex correlation is an effective symbol length $N_{FFT}$ of the symbol, a start location of the first half interval is ahead of a start location of the second half interval, and the start locations of the first half and second half intervals are within the guard interval.

The reference signal in the correlation is generated in accordance with the locations of the first half interval and the second half interval of the OFDM symbols including the guard interval.

A distance between the first half interval and the second half interval in the guard interval is set to a guard interval length, and the distance between the first half interval and the second half interval is shorter than the guard interval length according to an actual system which applies the frequency offset estimation. Thus, the frequency offset can be estimated within an estimation range.

Figure 2:
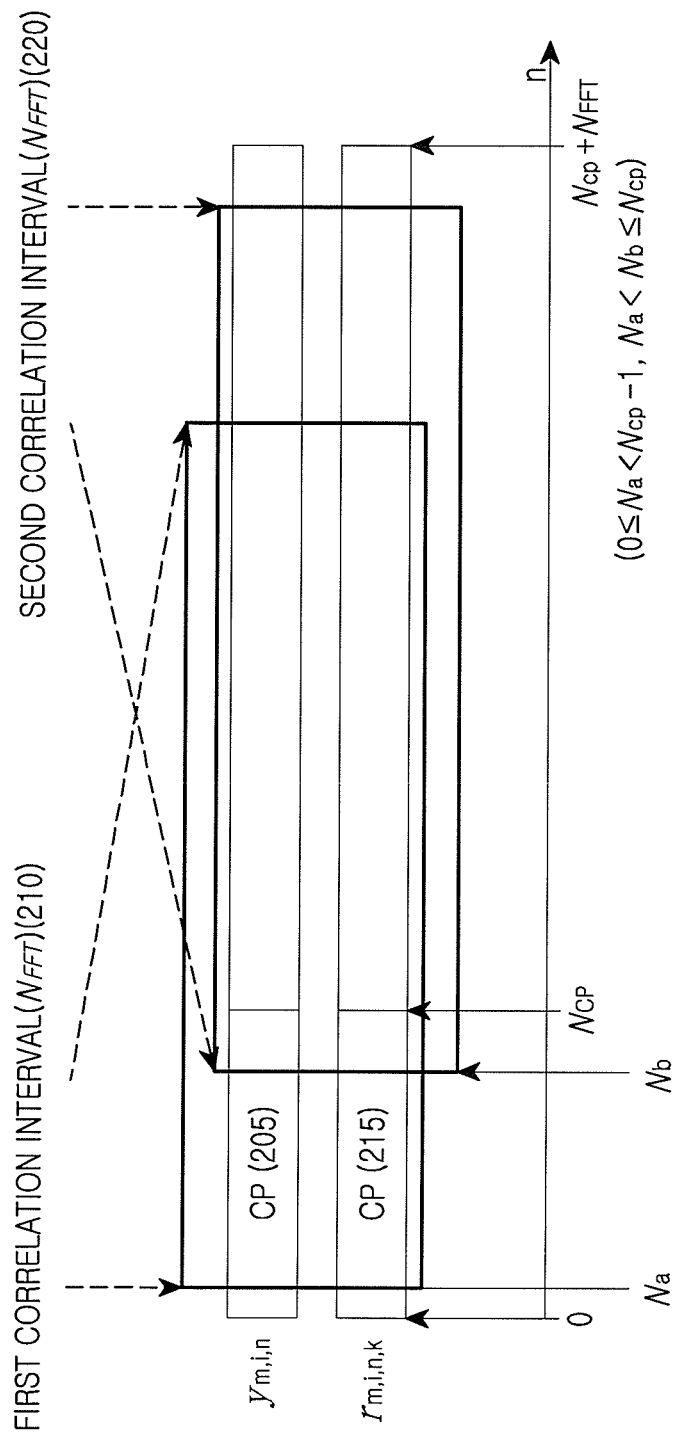
FIG. 2 illustrates correlation fine frequency offset estimation according to an exemplary embodiment of the present disclosure.

FIG. 2 depicts correlation fine frequency offset estimation according to an exemplary embodiment of the present disclosure.

Referring to FIG. 2, the frequency offset between a receiving device and a transmitting device sending a k-th subcarrier in an i-th symbol of an m-th mini-slot is estimated by processing the differential operation on a complex correlation result $h_{m,i,k|a}$ of the first half interval (a first correlation interval) 210 and a complex correlation result $h_{m,i,k|b}$ of the second half interval (a second correlation interval) 220 including guard intervals 205 and 215.

The frequency offset estimation can be expressed with an equation. When the transmitting device $N_{device}$ sends the reference signal over different subcarriers, the n-th reference signal of the i-th symbol of the m-th mini-slot received at the receiving device can be defined as Equation 1.

Herein, since the device uses different single tones in the frequency domain to send a Peer Discovery Resource ID (PDRID), the receiving device receives the overlapping signals from the multiple transmitting devices which are affected by a plurality of frequency offsets in the time domain.

$$y_{m,i,n} = \sum_{k=0}^{N_{device}-1} x_{m,i,n,k} e^{j2\pi\epsilon_{m,k}n/N_{FFT}} + w_{m,i,n} \quad (1)$$

The complex correlation result $h_{m,i,k|a}$ of the front half interval 210 between the receive reference signal y and the retained reference signal r of Equation 1 is defined as Equation 2.

$$h_{m,i,k|a} = \sum_{n=N_a}^{N_a+N_{FFT}-1} y_{m,i,n} \cdot r^*_{m,i,n,k} \in S_p \quad (2)$$

$$= \sum_{n=N_a}^{N_a+N_{FFT}-1} \left( \sum_{k=0}^{N_{device}-1} x_{m,i,n,k} e^{j2\pi\epsilon_{m,k}n/N_{FFT}} + w_{m,i,n} \right) \cdot$$

$$(x_{m,i,n,k})^*$$

$N_a$ denotes the start location of the front half interval 210, $N_a+N_{FFT}-1$ denotes an end location of the front half interval 210, and $S_p$ denotes a location set of the pilot symbol.

When the influence of the phase rotation $e^{j2\pi\epsilon_{m,k}n/N_{FFT}}$ due to the frequency offset can be disregarded in Equation 2, the signal component sent from the other transmitting device in the k-th subcarrier becomes zero according to OFDM signal characteristics and Equation 2 can be expressed as Equation 3.

$$h_{m,i,k|a} = \sum_{n=N_a}^{N_a+N_{FFT}-1} x_{m,i,n,k} e^{j2\pi\epsilon_{m,k}n/N_{FFT}} \cdot (x_{m,i,n,k})^* \quad (3)$$

-continued $$= \sum_{n=N_a}^{N_a+N_{FFT}-1} x_{m,i,n,k} \cdot (x_{m,i,n,k})^* e^{j2\pi\varepsilon_{m,k} n/N_{FFT}}$$

$$= \sum_{n=N_a}^{N_a+N_{FFT}-1} e^{j2\pi\varepsilon_{m,k} n/N_{FFT}}$$

$$= \alpha$$

Since each link between the multiple transmitting devices and the receiving device uses the single tone with a particular subcarrier, each sample in the time domain has the power of 1 after the differential operation based on Equation 4.

$$x_{m,i,n,k} \cdot (x_{m,i,n,k})^* = |x_{m,i,n,k}|^2 \quad (4)$$
$$= 1$$

Hence, the complex correlation result of the front half interval can be expressed as a sum of the phase rotations as the symbol increases as expressed in Equation 4.

The complex correlation result $h_{m,i,k|b}$ of the second half interval 220 between the receive reference signal y and the retained reference signal r of Equation 1 is given by Equation 5.

$$h_{m,i,k|b} = \sum_{n=N_b}^{N_b+N_{FFT}-1} y_{m,i,n} \cdot r^*_{m,i,n,k}, \, i \in S_p \quad (5)$$

$$= \sum_{n=N_b}^{N_b+N_{FFT}-1} \left( \sum_{k=0}^{N_{device}-1} x_{m,i,n,k} e^{j2\pi\varepsilon_{m,k} n/N_{FFT}} + w_{m,i,n} \right) \cdot$$

$$(x_{m,i,n,k})^*$$

$$= \sum_{n=N_a}^{N_a+N_{FFT}-1} \left( \sum_{k=0}^{N_{device}-1} x_{m,i,n,k} e^{j2\pi\varepsilon_{m,k} (n+(N_b-N_a))/N_{FFT}} + \right.$$

$$\left. w_{m,i,n} \right) \cdot (x_{m,i,n,k})^*$$

$$= e^{j2\pi\varepsilon_{m,k}(N_b-N_a)/N_{FFT}} \cdot \sum_{n=N_a}^{N_a+N_{FFT}-1} x_{m,i,n,k} e^{j2\pi\varepsilon_{m,k} n/N_{FFT}} \cdot$$

$$(x_{m,i,n,k})^*$$

$$= e^{j2\pi\varepsilon_{m,k}(N_b-N_a)/N_{FFT}} \cdot \alpha$$

When the complex correlation result of the second half interval 220 is compared with the complex correlation result of the first half interval 210, the sum of the phase rotations is proportional to the interval distance.

$N_b$ denotes the start location of the second half interval 220, and $N_b+N_{FFT}-1$ denotes an end location of the second half interval 220.

By processing the differential operation on the complex correlation result $h_{m,i,k|a}$ of the first half interval 210 and the complex correlation result $h_{m,i,k|b}$ of the second half interval 220 of Equation 3 and Equation 5, the frequency offset can be estimated based on Equation 6.

$$h_{m,i,k|b} \cdot (h_{m,i,k|a})^* = |\alpha|^2 \cdot e^{j2\pi\varepsilon_{m,k}(N_b-N_a)/N_{FFT}} \quad (6)$$

$$\therefore \hat{\varepsilon}_{m,k} = \frac{N_{FFT}}{2\pi(N_b-N_a)} \tan^{-1} \left( \frac{\sum_{i=0,i \in S_p}^{N_p-1} \text{Im}\{h_{m,i,k|b} \cdot h^*_{m,i,k|a}\}}{\sum_{i=0,i \in S_p}^{N_p-1} \text{Re}\{h_{m,i,k|b} \cdot h^*_{m,i,k|a}\}} \right)$$

The correlation result of the first half interval 210 and the correlation result of the second half interval 220 include an additional phase rotation besides the common component. The frequency offset component can be detected by applying an arc-tan operation to the additional phase rotation.

Figure 3:
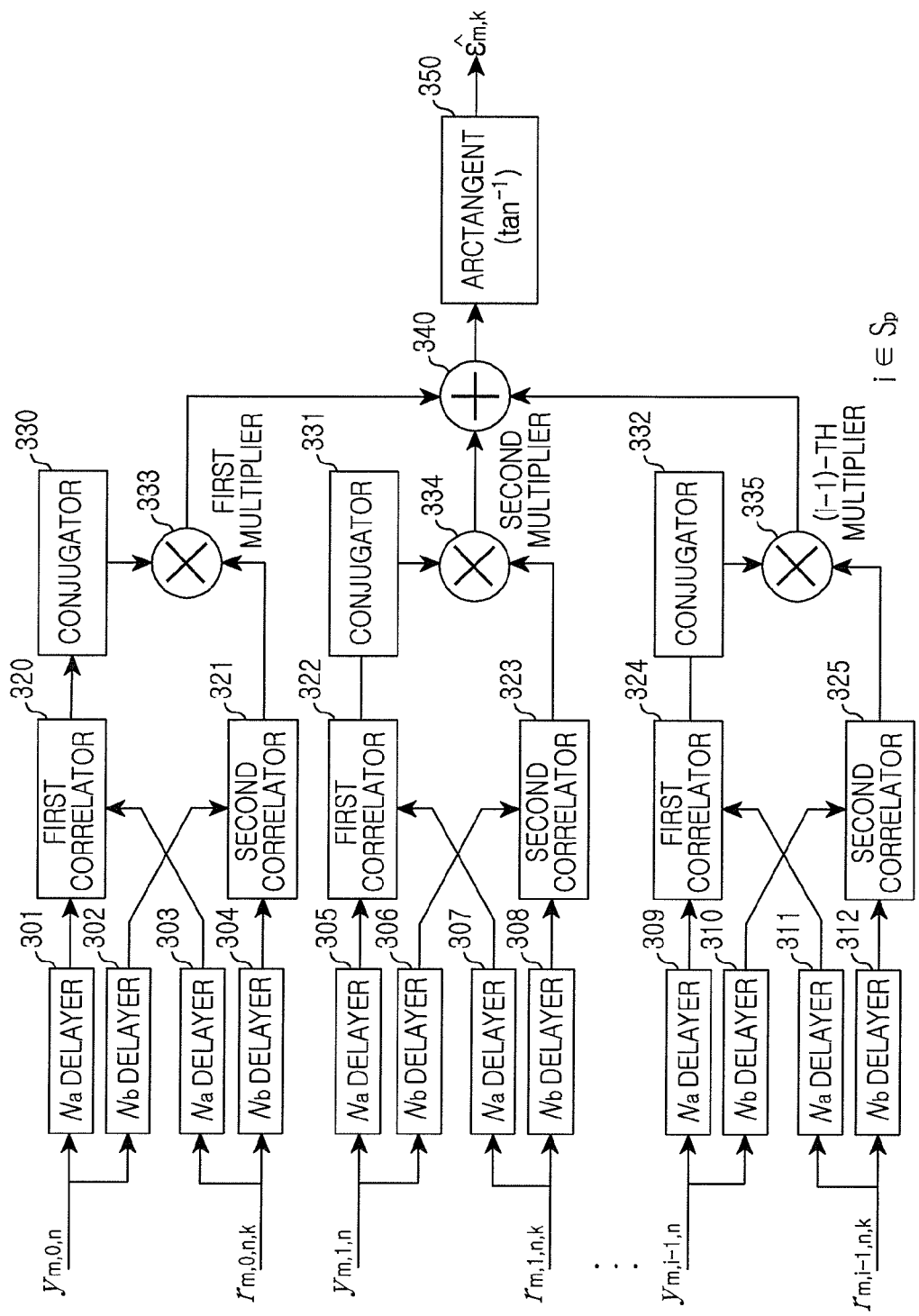
FIG. 3 illustrates a frequency offset estimator for estimating a frequency offset in a link between a transmitting device and a receiving device using a k-th subcarrier of an i-th symbol of an m-th mini-slot according to an embodiment of the present disclosure.

FIG. 3 is a block diagram of a frequency offset estimator for estimating the frequency offset $\hat{\varepsilon}_{m,k}$ in the link between the transmitting device and the receiving device using the k-th subcarrier of the i-th symbol of the m-th mini-slot according to an exemplary embodiment of the present disclosure.

Referring to FIG. 3, the frequency offset estimator applies the differential operation to the correlation result of the first half interval and the second half interval of every symbol of the reference signal received at the receiving device from the transmitting device in the m-th mini-slot and the reference signal of the m-th mini-slot retained by the transmitting device, accumulates the differential operation values, and then estimates the frequency offset.

For example, in the 0-th symbol, the frequency offset estimator delays the first half interval and the second half interval of the n-th reference signal of the 0-th symbol received in the m-th mini-slot, using a $N_a$ delayer 301 and a $N_b$ delayer 302. The frequency offset estimator delays the first half interval and the second half interval of the n-th reference signal of the 0-th symbol retained for the transmitting device, using a $N_a$ delayer 303 and a $N_b$ delayer 304.

Next, the frequency offset estimator correlates the first half interval and the second half interval of the received reference signal with the first half interval and the second half interval of the retained reference signal using a first correlator 320 and a second correlator 321.

Next, the frequency offset estimator performs the correlation and then conjugates the front half interval using a conjugator 330.

Next, the frequency offset estimator performs the correlation using a first multiplier 333 and multiplies the correlation result of the conjugated first half interval and the correlation result of the second half interval. That is, the frequency offset estimator performs the differential operation.

For example, in the first symbol, the frequency offset estimator delays the first half interval and the second half interval of the n-th reference signal of the first symbol received in the m-th mini-slot, using a $N_a$ delayer 305 and a $N_b$ delayer 306. The frequency offset estimator delays the first half interval and the second half interval of the n-th reference signal of the first symbol retained for the transmitting device, using a $N_a$ delayer 307 and a $N_b$ delayer 308.

Next, the frequency offset estimator correlates the first half interval and the second half interval of the received reference signal with the first half interval and the second half interval of the retained signal using a first correlator 322 and a second correlator 323.

Next, the frequency offset estimator performs the correlation and then conjugates the front half interval using a conjugator 331.

Next, the frequency offset estimator performs the correlation using a second multiplier 334 and multiplies the correlation result of the conjugated first half interval and the correlation result of the second half interval. That is, the frequency offset estimator performs the differential operation.

For example, in the (i−1)-th symbol, the frequency offset estimator delays the first half interval and the second half interval of the (i−1)-th reference signal of the first symbol received in the m-th mini-slot, using a $N_a$ delayer 309 and a $N_b$ delayer 310. The frequency offset estimator delays the first half interval and the second half interval of the n-th reference signal of the (i−1)-th symbol of the first symbol retained for the transmitting device, using a $N_a$ delayer 311 and a $N_b$ delayer 312.

Next, the frequency offset estimator correlates the first half interval and the second half interval of the received reference signal with the first half interval and the second half interval of the retained reference signal, using a first correlator 324 and a second correlator 325.

Next, the frequency offset estimator performs the correlation and then conjugates the front half interval using a conjugator 332.

Next, the frequency offset estimator performs the correlation using a (i−1)-th multiplier 335 and multiplies the correlation result of the conjugated first half interval and the correlation result of the second half interval. That is, the frequency offset estimator performs the differential operation.

After the correlation and the multiplication, the frequency offset estimator adds the products of the first multiplier 333, the second multiplier 334, and the (i−1)-th multiplier 335 using an adder 340, and calculates the phase rotation value using an arctangent 350.

Table 1 compares a frequency offset estimation range of a conventional frequency offset estimation method and the present frequency offset estimation method.

TABLE 1

Comparison of the frequency offset estimation range of the estimation methods

| frequency offset estimation method | frequency offset estimation range |
|---|---|
| Beek algorithm | $-0.5 < \varepsilon < 0.5$ |
| Moose algorithm | $-\dfrac{0.5}{N_d\left(1+\dfrac{N_{CP}}{N_{FFT}}\right)} < \varepsilon < \dfrac{0.5}{N_d\left(1+\dfrac{N_{CP}}{N_{FFT}}\right)}$ |
| the present frequency offset estimation method | $-0.5 \cdot \dfrac{N_{FFT}}{(N_b-N_a)} < \varepsilon < 0.5 \cdot \dfrac{N_{FFT}}{(N_b-N_a)}$ |

As shown in Table 1, the Beek's algorithm has the enough frequency offset estimation range but cannot estimate the independent frequency offset per link. The Moose's algorithm can estimate the independent frequency offset per link but is inapplicable to the actual environment because the frequency offset estimation range reduces in proportion to the increase of the symbol index.

By contrast, the present frequency offset estimation method can achieve the independent frequency offset estimation per link and attain the quite wide frequency offset estimation range corresponding to at least 4 times the Beek's algorithm when the guard interval length is ¼ of the effective interval length.

When the present frequency offset estimation method is applied to the actual system, the following application can be used to enhance the frequency offset estimation performance.

Due to the differential operation, as the phase difference between $h_{m,i,k|b}$ and $h_{m,i,k|a}$ increases within the at an operation estimation range, the present disclosure can improve jitter caused by noise and interference.

When the phase rotation of $h_{m,i,k|a}$ of the first symbol from the estimated frequency offset and $h_{m,i,k|b}$ of the next symbol lies within the at an estimation range, the present disclosure can detect the phase rotation between the two symbols. That is, the frequency offset can be estimated by operating $h_{m,i,k|b}$ and $h_{m,i,k|a}$ in initial two symbols.

The frequency offset estimation range of the present disclosure can adjust a maximum frequency offset estimation range by controlling the first half interval and the second half interval of the complex correlation as shown in Table 1.

Initial synchronization in a general OFDM system performs initial coarse timing synchronization and coarse frequency synchronization together from the received preamble. The frequency offset estimation method of the present disclosure can fulfill the coarse frequency offset estimation and the fine frequency offset estimation together even when the coarse frequency offset estimation using the preamble is difficult.

In FIG. 3, the phase rotation value is calculated by correlating the reference signal received from one transmitting device and the reference signal retained for the transmitting device. The method for calculating the phase rotation value based on the correlation of the multiple transmitting devices is explained now.

Now, the present frequency offset compensation for achieving the frequency synchronization is described.

The present frequency synchronization is performed based on characteristics of the D2D communication system, and the frequency synchronization is divided into two steps including the frequency offset estimation and the estimated frequency offset compensation.

The operations of the D2D communication system can be divided to device discovery/scheduling/data traffic transmission and reception. Unlike a device discovery interval where a plurality of devices participates all together, the receiving device receives the signal only from the single device in a data traffic transmission/reception interval. Accordingly, the frequency synchronization of the receiving device in the data traffic transmission/reception interval conforms to the estimation and the compensation based on a loop filter of the conventional OFDM system.

Figure 4:
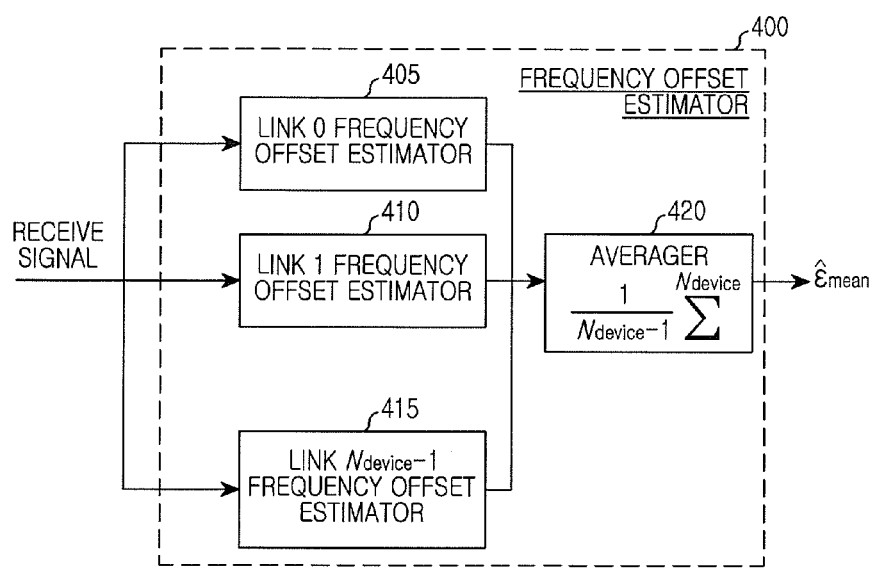
FIG. 4 illustrates the frequency offset estimator for estimating the frequency offset of every link according to an exemplary embodiment of the present disclosure.

FIG. 4 is a block diagram of the frequency offset estimator for estimating the frequency offset of every link according to an embodiment of the present disclosure.

Referring to FIG. 4, a link 0 frequency offset estimator 405 applies the differential operation to the correlation result of the first half and second half intervals of every symbol of the reference signal received at the receiving device from a first transmitting device (assuming the link 0) in the m-th mini-slot and the reference signal retained by the transmitting device in the m-th mini-slot, accumulates the differential operation values, and then estimates the frequency offset.

A link 1 frequency offset estimator 410 applies the differential operation to the correlation result of the first half and second half intervals of every symbol of the reference signal received at the receiving device from a second transmitting device (assuming the link 1) in the m-th mini-slot and the reference signal retained by the transmitting device in the m-th mini-slot, accumulates the differential operation values, and then estimates the frequency offset.

A link $N_{device}-1$ frequency offset estimator 415 applies the differential operation to the correlation result of the first half and second half intervals of every symbol of the reference signal received at the receiving device from a $N_{device}-1$-th transmitting device (assuming the link $N_{device}-1$) in the m-th mini-slot and the reference signal retained by the transmitting device in the m-th mini-slot, accumulates the differential operation values, and then estimates the frequency offset.

An averager 400 accumulates and averages all of the estimated frequency offsets per link output from the link 0 frequency offset estimator 405, the link 1 frequency offset estimator 410, and the link $N_{device}-1$ frequency offset estimator 415. The mean is calculated based on Equation 7.

$$\hat{\varepsilon}_{mean} = \frac{1}{N_{device}} \sum_{m=0}^{N_T-1} \sum_{k=0}^{N_F-1} \hat{\varepsilon}_{m,k} \tag{7}$$

Figure 5:
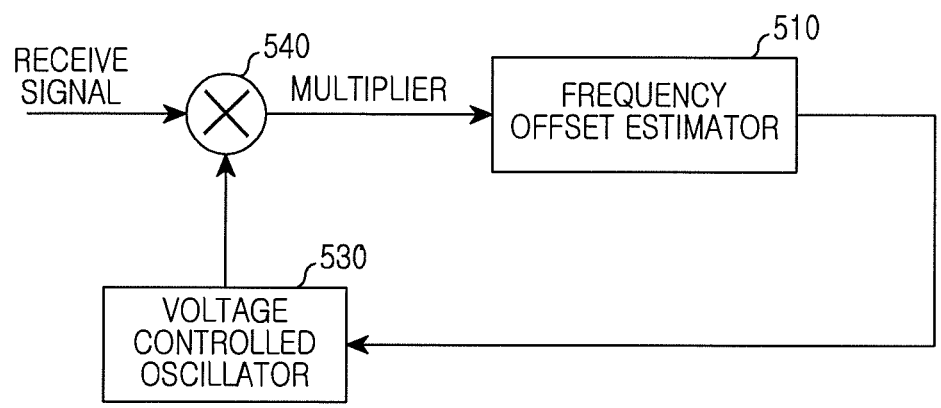
FIG. 5 illustrates a frequency offset compensator for compensating for the frequency offset of every link according to an embodiment of the present disclosure.

FIG. 5 is a block diagram of a frequency offset compensator for compensating for the frequency offset of every link according to an exemplary embodiment of the present disclosure.

Referring to FIG. 5, a frequency offset compensator directly compensates for a voltage controlled oscillator 530 using the mean of FIG. 4 without using the loop filter after the end of the device discovery interval.

That is, the frequency offset estimator 510 provides the output value (the mean of FIG. 4) to the voltage controlled oscillator 530, and the voltage controlled oscillator 530 adjusts its frequency using the received output value of the frequency offset estimator 510.

A multiplier 540 multiples the receive signal by the adjusted signal of the voltage controlled oscillator 530.

As a result, the device including the frequency offset compensator can modify its transmit frequency and then send the signal for the PDRID transmission in the next device discovery interval.

Equation 8 expresses the frequency offset compensation of the voltage controlled oscillator 530.

$$f_{c,modified} = f_c + \hat{\varepsilon}_{mean} \tag{8}$$

$\hat{\varepsilon}_{mean}$ denotes the mean of the frequency offset estimates, $f_c$ denotes the transmit frequency of the corresponding device, and $f_{c,\,modified}$ denotes the modified transmit frequency.

Figure 6:
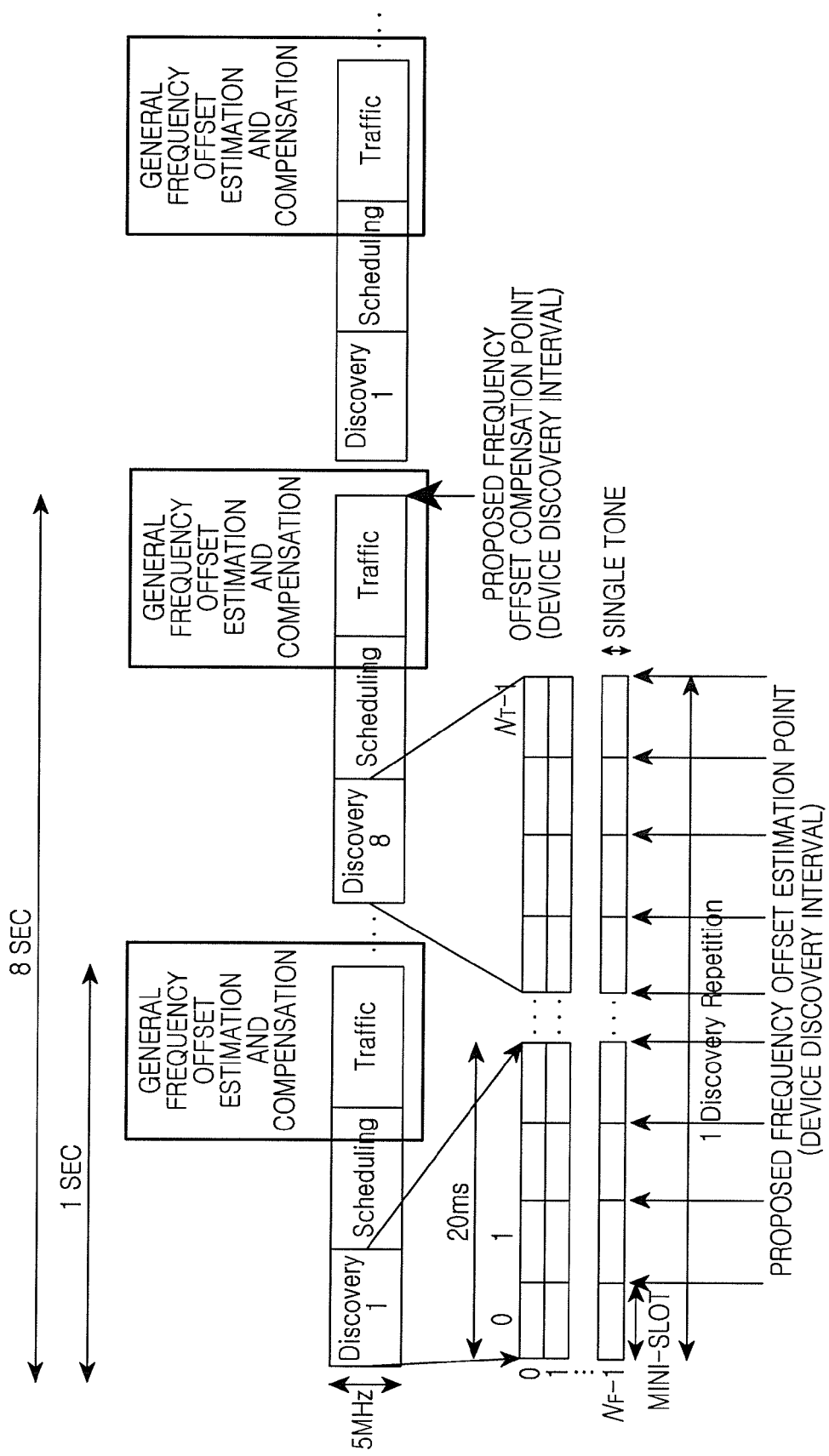
FIG. 6 illustrates frequency offset compensation points for modifying a transmit frequency according to an exemplary embodiment of the present disclosure.

FIG. 6 depicts frequency offset compensation points for adjusting the transmit frequency according to an exemplary embodiment of the present disclosure;

Referring to FIG. 6, the compensation point of the device discovery interval is always the RDPID information transmission point of the next discovery interval after the device discovery ends.

The data traffic interval conforms to the conventional frequency synchronization method in order to put top priority on the demodulation of the actually received signal. In the device discovery, the average frequency offset estimated directly by the voltage controlled oscillator is compensated without using the loop filter because the corresponding device synchronizes the frequency with neighboring devices of a network as soon as possible by modifying its transmit frequency and thus lessening the frequency difference between the devices.

Such frequency offset estimation by correcting the transmit frequency is repeated as the device discover progresses, and the frequency synchronization between the devices of the network can be achieved within several frames.

Figure 7:
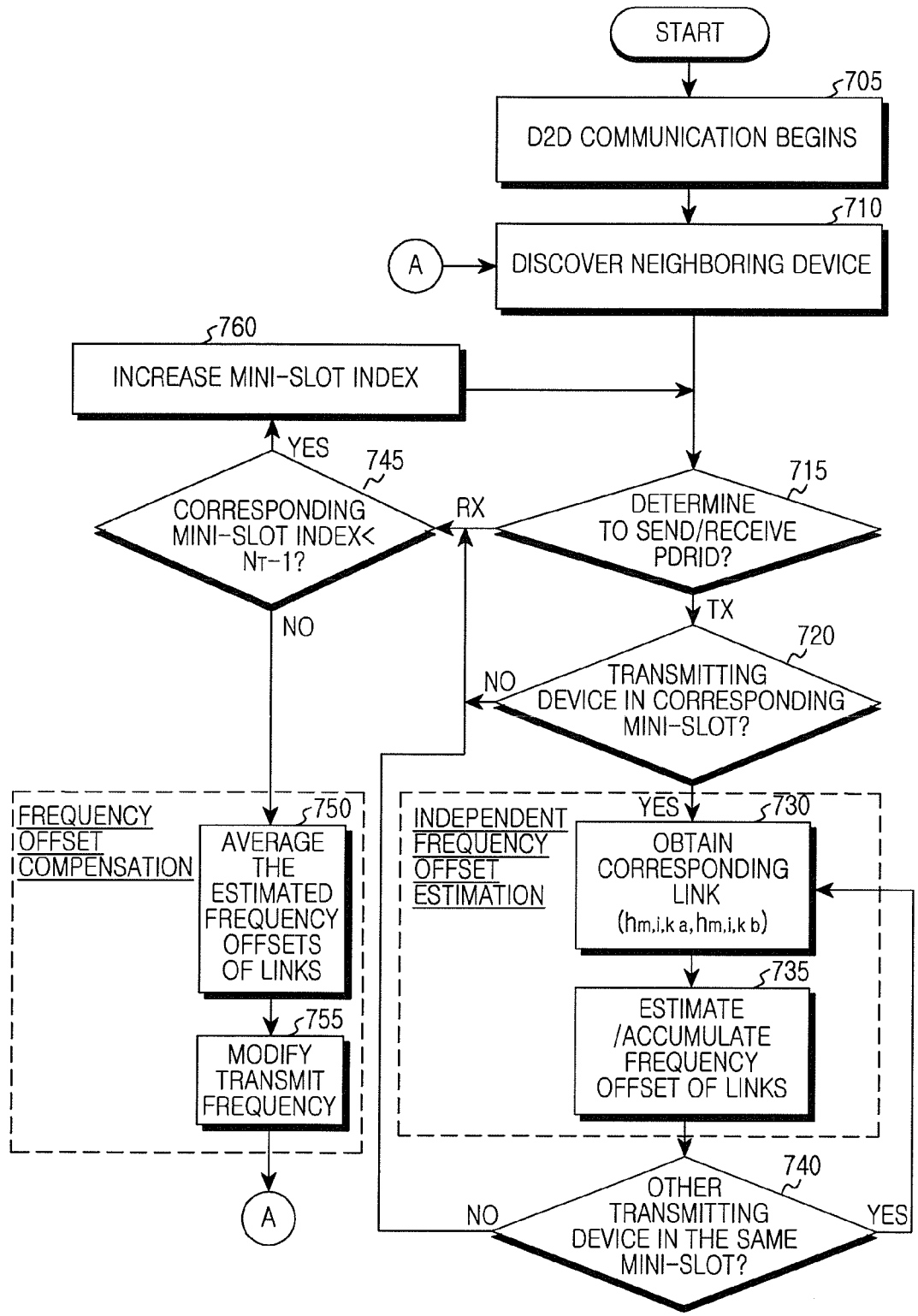
FIG. 7 illustrates a method for estimating and compensating for the frequency offset according to an embodiment of the present disclosure.

FIG. 7 is a flowchart of a method for estimating and compensating for the frequency offset according to an exemplary embodiment of the present disclosure.

Referring to FIG. 7, after the D2D communication begins in step 705, the receiving device commences the neighboring device discovery in step 710.

When discovering the device, the receiving device determines whether to receive or transmit the PDRID in step 715. When receiving the PDRID, the receiving device determines whether the transmitting device exists in the corresponding mini-slot in step 720. This implies that the receiving device determines whether the reference signal is received from the other transmitting device.

When the transmitting device is in the corresponding mini-slot in step 720, the receiving device obtains the correlation result of the first half interval and the second half interval of the link between the transmitting device and the receiving device in step 730, processes the differential operation on the correlation result, and estimates the frequency offset by accumulating the result values in step 735. The receiving device repeats the correlation and the frequency offset estimation in steps 720 and 730 until other transmitting device is absent.

The receiving device applies the correlation and the frequency offset estimation to every mini-slot in a particular mini-slot range $N_T$ in steps 745 and 760. When all of the mini-slots in the particular mini-slot range are processed in step 745, the receiving device averages the frequency offsets estimated in the link with the multiple transmitting devices in step 750 and compensates for its oscillator by adding the mean values in step 755.

For the device discovery, the receiving device determines whether to receive or send the PDRID. To transmit the PDRID in step 715, the receiving device averages the frequency offsets estimated in the link with the multiple transmitting devices in the particular mini-slot $N_T$ in step 750 and compensates for its oscillator by adding the mean values in step 755. That is, the receiving device compensates for the oscillator in every particular mini-slot $N_T$.

Figure 8:
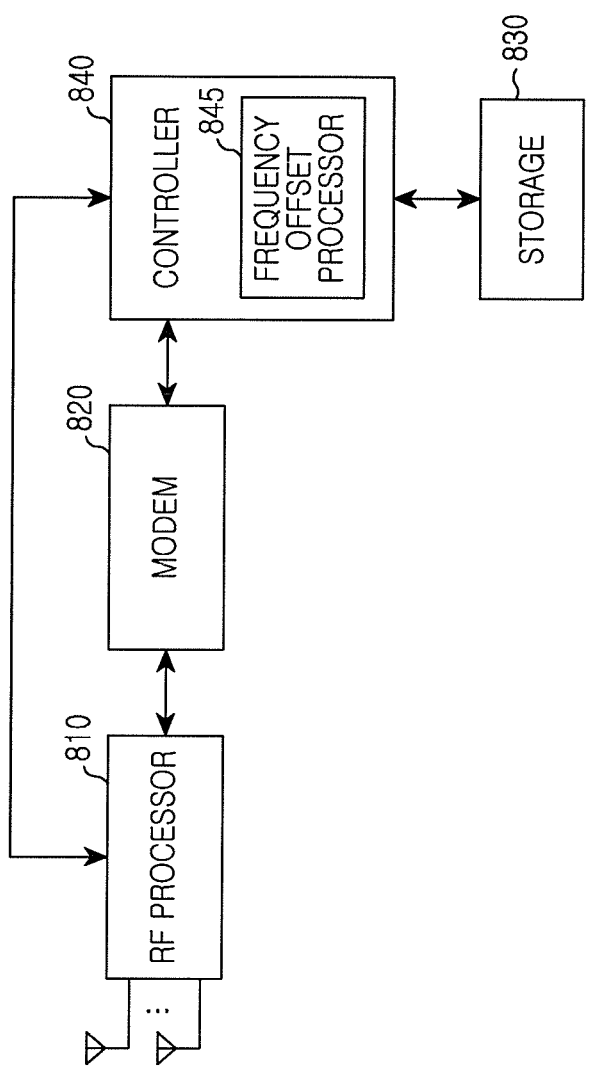
FIG. 8 illustrates a device according to an exemplary embodiment of the present disclosure.

FIG. 8 is a block diagram of the device according to an exemplary embodiment of the present disclosure.

Referring to FIG. 8, the device includes a Radio Frequency (RF) processor 810, a modem 820, a storage 830, and a controller 840.

The RF processor 810 transmits and receives signals over a radio channel using signal band conversion and amplification. That is, the RF processor 810 up-converts a baseband signal fed from the modem 820 to an RF signal, transmits the RF over an antenna, and down-converts an RF signal received over the antenna to a baseband signal. For example, the RF processor 810 can include an amplifier, a mixer, an oscillator, a Digital to Analog Converter (DAC), an Analog to Digital Converter (ADC), and so on.

The modem 820 converts the baseband signal to a bit sequence and vice versa according to a physical layer standard of the system. For example, to transmit data according to the OFDM, the modem 820 generates the complex symbols by encoding and modulating a transmit bit sequence, maps the complex symbols to the subcarriers, and generates the OFDM symbols using Inverse Fast Fourier Transform (IFFT) and Cyclic Prefix (CP) addition. When receiving data, the modem 820 splits the baseband signal fed from the RF processor 810 to the OFDM symbols, restores the signals mapped to the subcarriers using FFT, and restores the receive bit sequence by demodulating and decoding the signals.

The storage 830 stores data such as basic program for operating the device, application program, and setup information. Particularly, the storage 830 can store the reference signals of the other transmitting devices.

The controller 840 controls the operations of the device. For example, the controller 840 transmits and receives the signals through the modem 820 and the RF processor 810. The controller 840 records and reads the data to and from the storage 830. The controller 840 can include a frequency offset processor 845.

The frequency offset processor 845 receives the reference signals from the other transmitting devices, and processes the correlation and the differential operation on the received reference signals with the reference signals of the other transmitting device stored in the storage 830.

Next, the frequency offset processor 845 estimates and accumulates the frequency offset of the links between the device and the other transmitting devices, averages the accumulated values, and provides the mean to the voltage controlled oscillator of the RF processor 810.

The voltage controlled oscillator embedded in the RF processor 810 receives and compensates for the mean by adding the mean.

Figure 9:
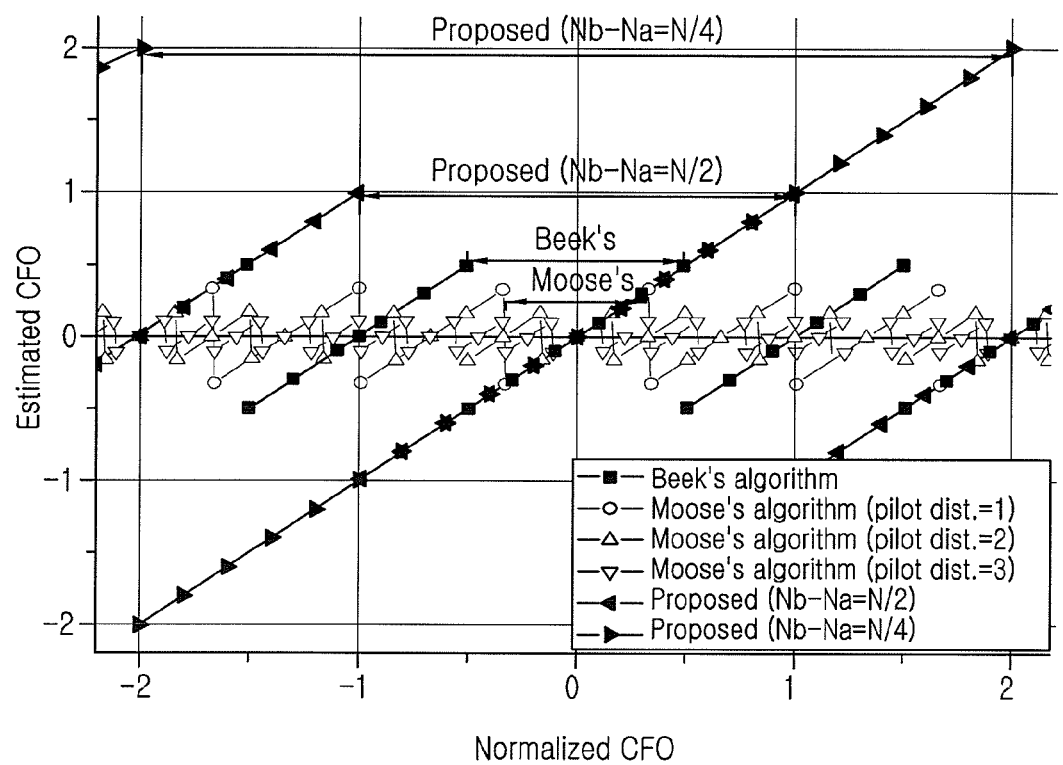
FIG. 9 illustrates a graph for comparing a frequency offset estimation range of estimation methods according to an embodiment of the present disclosure.

FIG. 9 is a graph for comparing the frequency offset estimation range of the estimation methods according to an exemplary embodiment of the present disclosure.

Referring to FIG. 9, the Beek's algorithm has the enough frequency offset estimation range but cannot estimate the independent frequency offset per link. The Moose's algorithm can estimate the independent frequency offset per link but is inapplicable to the actual environment because the frequency offset estimation range reduces in proportion to the increase of the symbol index. By contrast, the present frequency offset estimation method can achieve the independent frequency offset estimation per link and have the far wider guard interval allowing the frequency offset estimation than the Beek's algorithm.

Table 2 shows parameters of a computer simulation to compare the present frequency synchronization performance with the conventional method.

TABLE 2

<Simulation parameters>

| Parameter | Value |
| --- | --- |
| the number of terminals | 1Tx-1Rx, 1000, 3584 |
| type of terminal distribution | equal distribution |
| geographic environment | 1 km × 1 km square topography |
| bandwidth | 5 MHz |
| center frequency | 2.6 GHz |
| Modulation method | QPSK (data), BPSK (pilot) |
| FFT size | 64 |
| channel | Ideal, AWGN ITU Pedestrian-A, COST 207 TU |
| Pathloss models | ITU-1411 LOS (lower bound) |
| normalized frequency offset | ±0.2165 |

Figure 10:
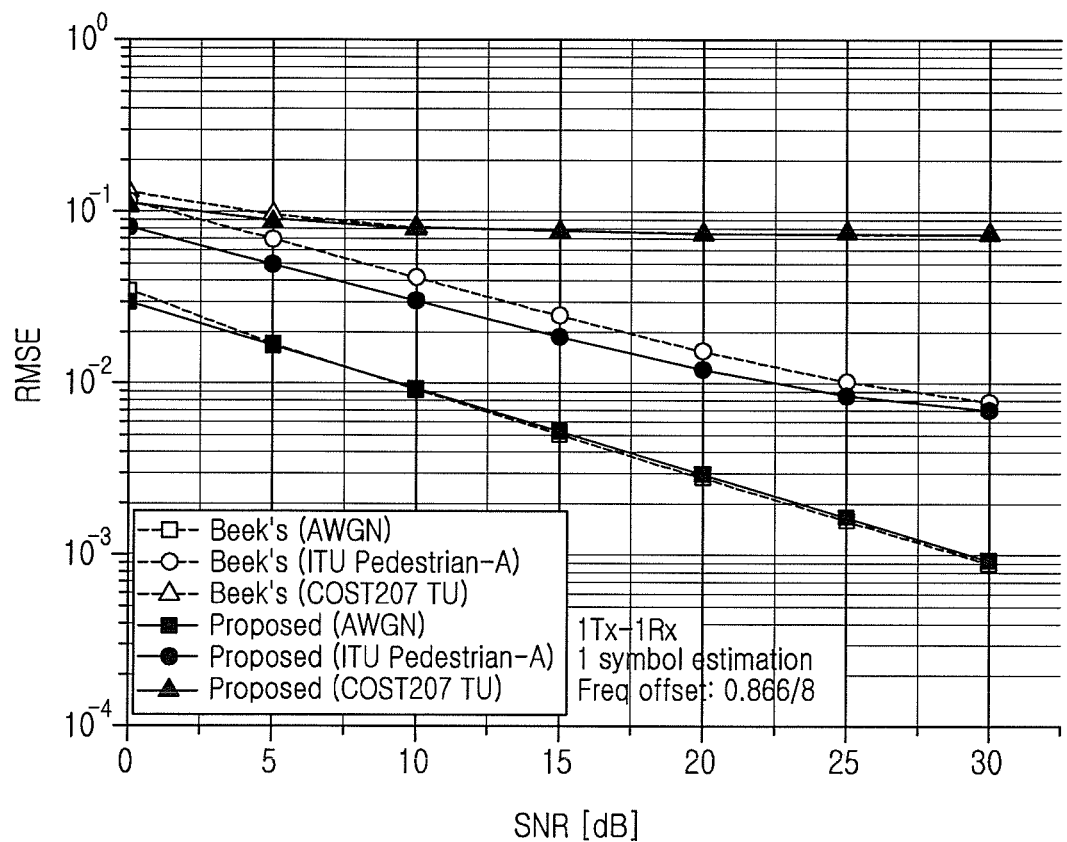
FIG. 10 illustrates Root Mean Square Error (RMSE)s of the present disclosure and the conventional methods when the frequency offset is estimated using a single symbol in a single-link environment.

FIG. 10 is a graph of Root Mean Square Error (RMSE) of the present disclosure and the conventional method when the frequency offset is estimated using the single symbol in a single-link environment.

Referring to FIG. 10, the conventional method and the present method show the similar performances in the single-symbol estimation.

Figure 11:
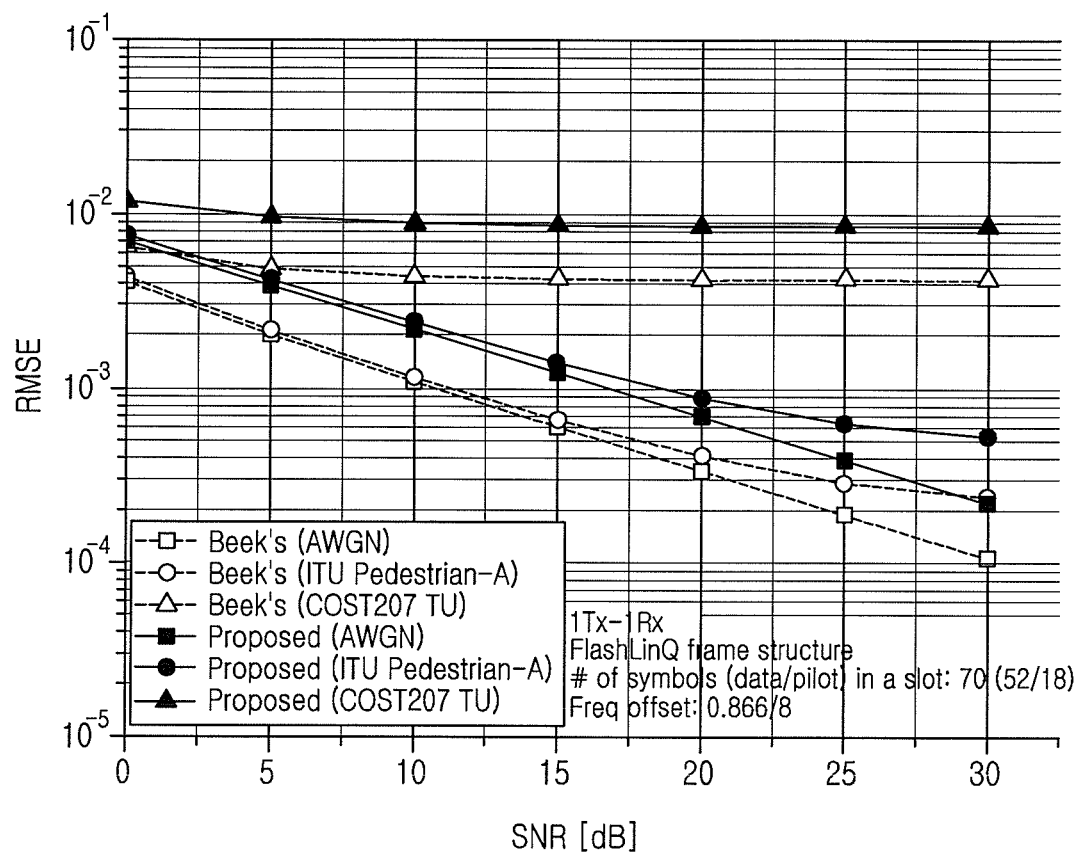
FIG. 11 illustrates the performance of the present disclosure when a FlashLinQ device discovery signal structure is applied to the single-link environment according to an embodiment of the present disclosure.

FIG. 11 is a graph of the performance of the present disclosure when the FlashLinQ device discovery signal structure is applied to the single-link environment according to an exemplary embodiment of the present disclosure.

Referring to FIG. 11, compared to the conventional method which accumulates only the pilot in the FlashLinkQ device discovery signal structure, the present method can attain the relatively accurate frequency offset estimation by allowing the accumulation even in the other interval excluding the pilot interval.

Figure 12:
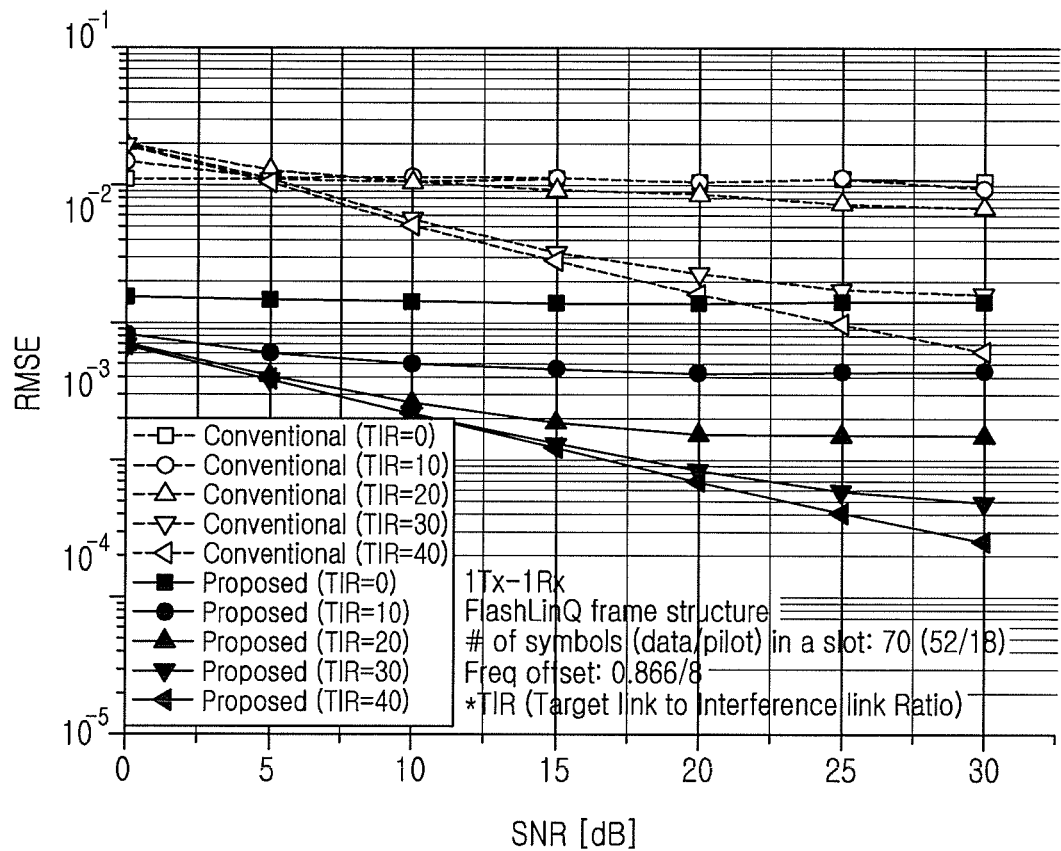
FIG. 12 illustrates a graph for comparing the RMSEs of the conventional method and the present disclosure based on a Target to Interference Ratio (TIR) in a multi-link environment.

FIG. 12 is a graph for comparing the RMSE of the conventional method and the present disclosure based on a Target to Interference Ratio (TIR) in a multi-link environment.

Referring to FIG. 12, in the multi-link environment, compared to the conventional method, the present method relatively fulfills the frequency offset estimation even when the TIR between the transmit link and the interference link is low. That is, the present disclosure, which knows the reference signal of the transmit link, can estimate the frequency offset even when the ICI of the link using the subcarrier excluding the transmit link subcarrier is considerable.

Figure 13:
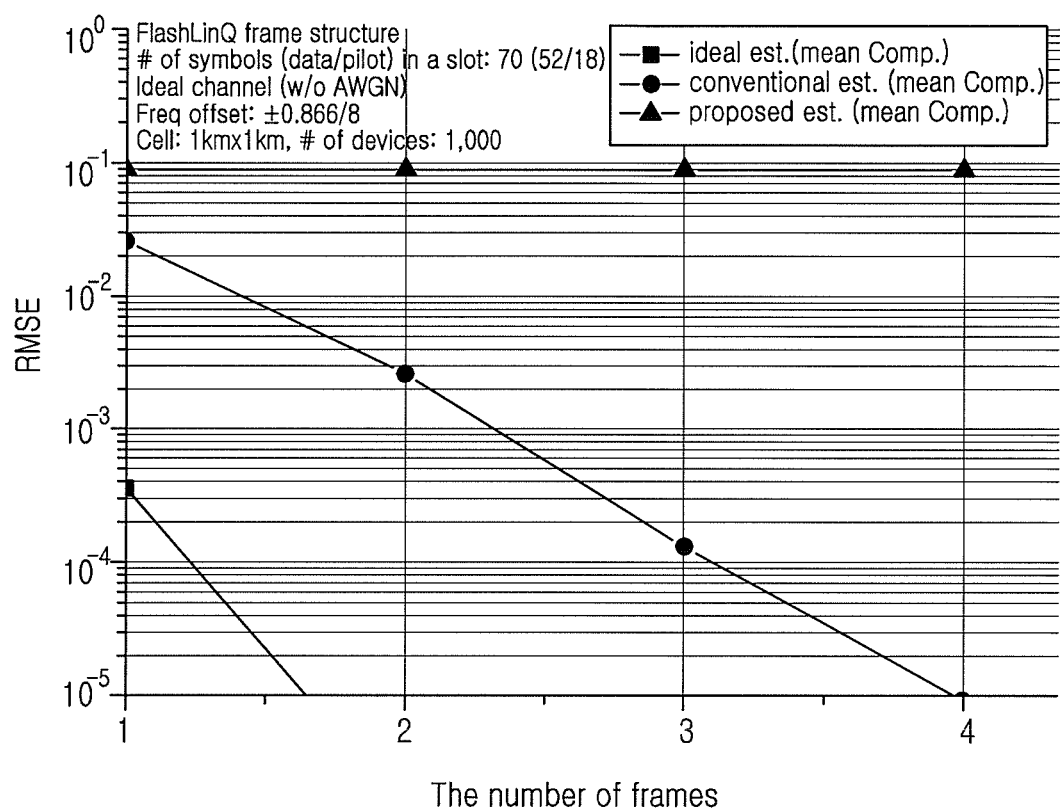
FIG. 13 illustrates a graph for comparing the RMSEs of the conventional method and the present disclosure when 1,000 devices reside in a cell and the frequency offset is compensated using a closed loop.

FIG. 13 is a graph for comparing the RMSE of the conventional method and the present disclosure when 1,000 devices reside in a cell and the frequency offset is compensated using the closed loop.

Referring to FIG. 13, in the conventional method, the RMSE does not converge even after the multiple device discovery frames are transmitted. Since the conventional method estimates a weighted value of the frequency offset according to the receive power gain, the determined frequency offset estimation value is grouped due to the distribution of the devices and the synchronization speed is low.

By contrast, the present method can achieve the independent frequency offset estimation of the transmit link and thus accomplish the frequency offset synchronization with the devices in the cell.

Accordingly, even when enough devices (1,000 devices) participate, the RMSE of the entire frequency offset converges to the value below $10^{-5}$ throughout the four frames after the compensation.

The methods as described in the claims and/or the specification of exemplary embodiments of the present disclosure can be implemented using hardware, software, or a combination of them.

As for the software, a computer-readable storage medium including one or more programs (software modules) may be provided. One or more programs stored in the computer-readable storage medium may be configured for execution by one or more processors of an electronic device. One or more programs include instructions for controlling the electronic device to execute the methods according to the exemplary embodiments as described in the claims and/or the specification of the present disclosure.

Such a program (software module, software) may be stored to a random access memory, a non-volatile memory including a flash memory, a Read Only Memory (ROM), an Electrically Erasable Programmable ROM (EEPROM), a magnetic disc storage device, a Compact Disc (CD)-ROM, Digital Versatile Discs (DVDs) or other optical storage devices, and a magnetic cassette. Alternatively, the programs may be stored to a memory combining part or all of those recording media. A plurality of memories may be equipped.

The programs may be stored in an attachable storage device accessible via a communication network such as Internet, Intranet, Local Area Network (LAN), Wide LAN (WLAN), or Storage Area Network (SAN), or a communication network by combining these networks. The storage device can access the present electronic device through an external port. A separate storage device may access the present electronic device over a communication network.

As set forth above, the present frequency offset estimation method can estimate the frequency offset using the phase rotation difference between the correlations of the receive signal and the reference signal of the transmit link without the limit on the frequency offset estimation range, and thus independently estimate the frequency offset between the multiple overlapping receive signals and the transmit link.

To compensate for the frequency offset, the present disclosure corrects the oscillator transmit frequency of the corresponding device by use of the mean of the estimates reflecting the power weight of the frequency offsets received from the multiple links, thus achieving the fast and accurate frequency synchronization.

The present frequency synchronization technique can be applied to various communication systems which receive a plurality of signals orthogonal in the frequency domain and overlapping in the time domain.

While the disclosure has been shown and described with reference to certain exemplary embodiments thereof, it will be understood by those skilled in the art that various changes in form and details may be made therein without departing from the spirit and scope of the disclosure as defined by the appended claims and their equivalents.

What is claimed is:

1. A method for operating a device in a wireless communication system supporting device to device (D2D) communication system, comprising:
   receiving a reference signal from at least one transmitting device;
   determining a frequency offset based on correlations between the reference signal and a comparison reference signal; and
   adjusting a transmit frequency using the determined frequency offset,
   wherein the correlations comprises a first correlation on a first interval of the reference signal and the comparison reference signal and a second correlation on a second interval of the reference signal and the comparison reference signal,
   wherein a start point of the first interval is ahead of a start point of the second interval, and
   wherein the start point of the first interval is placed in a guard interval of the reference signal.

2. The method of claim 1, wherein the determining the frequency offset based on the correlations between the reference signal and the comparison reference signal comprises:
   performing a differential operation on the first correlation and the second correlation; and
   averaging phase differences using a result of the differential operation.

3. The method of claim 2, wherein adjusting the transmit frequency using the determined frequency offset comprises:
   adjusting the transmit frequency using the averaged phase difference.

4. The method of claim 1, wherein a length of the first interval corresponds to a difference between a length of the reference signal and a length of the guard interval of the reference signal.

5. The method of claim 1, wherein a length of the second interval corresponds to a difference between a length of the reference signal and a length of the guard interval of the reference signal, and the start point of the second interval is placed in the guard interval of the reference signal.

6. The method of claim 1, wherein the comparison reference signal is pre-stored.

7. An apparatus for compensating for a frequency offset of a device in a wireless communication system supporting device to device (D2D) communication system, comprising:
   a frequency offset estimator configured to receive a reference signal from at least one transmitting device, and determine a frequency offset based on correlations between the reference signal and a comparison reference signal; and
   a voltage controlled oscillator configured to adjust a transmit frequency using the determined frequency offset,
   wherein the correlations comprises a first correlation on a first interval of the reference signal and the comparison reference signal and a second correlation on a second interval of the reference signal and the comparison reference signal,
   wherein a start point of the first interval is ahead of a start point of the second interval,
   wherein the start point of the first interval is placed in a guard interval of the reference signal.

8. The apparatus of claim 7, wherein, for the determination, the frequency offset estimator is configured to perform a differential operation on the first correlation and the second correlation, and average phase differences using a result of the differential operation.

9. The apparatus of claim 8, wherein the frequency offset estimator is configured to adjust the transmit frequency, using the averaged phase difference.

10. The apparatus of claim 7, wherein a length of the first interval corresponds to a difference between a length of the reference signal and a length of the guard interval of the reference signal.

11. The apparatus of claim 7, wherein a length of the second interval corresponds to a difference between a length of the reference signal and a length of the guard interval of the reference signal, and the start point of the second interval is placed in the guard interval of the reference signal.

12. The apparatus of claim 7, wherein the comparison reference signal is pre-stored.

13. An apparatus of a device in a wireless communication system supporting device to device (D2D) communication system, comprising:
   a radio frequency (RF) processor configured to cause at least one antenna to receive a reference signal from at least one transmitting device;
   a controller configured to determine a frequency offset based on correlations between the reference signal and a comparison reference signal; and
   an oscillator configured to adjust a transmit frequency using the determined frequency offset,
   wherein the correlations comprises a first correlation on a first interval of the reference signal and the comparison reference signal and a second correlation on a second interval of the reference signal and the comparison reference signal,
   wherein a start point of the first interval is ahead of a start point of the second interval, and
   wherein the start point of the first interval is placed in a guard interval of the reference signal.

14. The apparatus of claim 13, wherein, for the determination, the controller is configured to perform a differential operation on the first correlation and the second correlation, and average phase differences using a differential operation result.

15. The apparatus of claim 14, wherein the controller is configured to adjust the transmit frequency using the averaged phase difference.

16. The apparatus of claim 13, wherein a length of the first interval corresponds to a difference between a length of the reference signal and a length of the guard interval of the reference signal.

17. The apparatus of claim 13, wherein a length of the second interval corresponds to a difference between a length of the reference signal and a length of the guard interval of the reference signal, and the start point of the second interval is placed in the guard interval of the reference signal.

18. The apparatus of claim 13, wherein the comparison reference signal is pre-stored.

19. The apparatus of claim 13, wherein the RF processor comprises a voltage controlled oscillator.

* * * * *